United States Patent
Hayashi

(10) Patent No.: US 7,438,819 B2
(45) Date of Patent: Oct. 21, 2008

(54) TOC COMPONENT REMOVING APPARATUS AND PROCESS FOR REMOVING TOC COMPONENTS

(75) Inventor: Satoshi Hayashi, Komatsu (JP)

(73) Assignee: Komatsu Electronic Co., Ltd., Komatsu-shi, Ishikawa-ken (JP)

(*) Notice: Subject to any disclaimer, the term of this patent is extended or adjusted under 35 U.S.C. 154(b) by 0 days.

(21) Appl. No.: 11/812,853

(22) Filed: Jun. 22, 2007

(65) Prior Publication Data

US 2007/0246432 A1 Oct. 25, 2007

Related U.S. Application Data

(62) Division of application No. 11/181,896, filed on Jul. 15, 2005.

(30) Foreign Application Priority Data

Jul. 20, 2004 (JP) .............................. 2004-211339

(51) Int. Cl.
*C02F 1/32* (2006.01)
(52) U.S. Cl. .................... 210/748; 422/186.3
(58) Field of Classification Search ............. 422/186.3; 210/748
See application file for complete search history.

(56) References Cited

U.S. PATENT DOCUMENTS

| 4,438,337 A | 3/1984 | Forrat |
| 5,541,096 A | 7/1996 | Nomura et al. |
| 6,315,963 B1 | 11/2001 | Speer |
| 6,558,553 B1 * | 5/2003 | Amal et al. ................. 210/695 |
| 6,722,958 B2 | 4/2004 | Matsumoto et al. |
| 2004/0112813 A1 | 6/2004 | Sawada |

FOREIGN PATENT DOCUMENTS

JP 10-151450 6/1998

OTHER PUBLICATIONS

"Water Handbook" Water Handbook Member-of-Editorial-Board Meeting, Maruzen Co., Ltd., Mar. 31, Heisei 15 issue, p. 316-319, p. 345-347 (partial translation), date unknown.

* cited by examiner

*Primary Examiner*—Walter D. Griffin
*Assistant Examiner*—Cameron J Allen
(74) *Attorney, Agent, or Firm*—Nixon & Vanderhye P.C.

(57) ABSTRACT

A TOC component removing apparatus removes TOC components contained in ultrapure water or pure water. The apparatus includes a treatment tank into which the ultrapure water or the pure water is introduced, a plurality of spherical catalyst particles of which surfaces are photocatalyst, a tabular translucent holding body which holds the catalyst particles on one surface, and an ultraviolet-ray light source which is arranged near the translucent holding body and radiates ultraviolet rays with a wavelength of 254 nm.

1 Claim, 2 Drawing Sheets

TOC COMPONENT REMOVING APPARATUS AND PROCESS FOR REMOVING TOC COMPONENTS

This application is a divisional of application Ser. No. 11/181,896 filed Jul. 15, 2005, which in turn claims priority of Japanese application Ser. No. 2004-211339 filed Jul. 20, 2004, the entire contents of each of which is incorporated by reference in this application.

BACKGROUND OF THE INVENTION

1. Field of the Invention

The present invention relates to a process for removing TOC components and an apparatus for removing TOC components which are contained in a liquid, and relates to technology of removing TOC components contained in liquid, such as ultrapure water used in a process for producing a semiconductor, a liquid crystal, or medical supplies.

Priority is claimed on Japanese Patent Application No. 2004-211339, filed Jul. 20, 2004, the content of which is incorporated herein by reference.

2. Description of Related Art

With technological innovation and advance of technology in recent years, in the semiconductor industry, the liquid crystal industry, and the pharmaceutical industry, etc., ultrapure water (pure water) from which TOC components, such as organic matter, pyrogen, and bacteria, not to mention dissolved substances and suspended granular materials, such as ions, are removed as much as possible, is required. Such ultrapure water is produced by an ultrapure water producing system which is constituted by combining a filtrating apparatus, an ion exchanging apparatus, a hyper filtrating membrane apparatus, and a reverse osmosis membrane apparatus, etc., suitably.

However, although this ultrapure water producing system is effective to remove dissolved substances, such as ions and suspended granular materials, etc. contained in the unpurified water which is a processing target, it is not so effective to remove TOC components, such as organic materials, pyrogen, and bacteria, that is, TOC components of 5 to 20 ppb remain in the ultrapure water. If such ultrapure water in which TOC components remain is used in the above fields, there is a possibility that various troubles may occur. For example, when ultrapure water in which TOC components of 5 to 20 ppb remain is used as a rinsing water in producing semiconductors, such as LSIs, these TOC components adhere to the semiconductors as scales to cause contamination of the semiconductor, circuit destruction, etc. thereby lowering the yield of products.

In order to solve the problem mentioned above, for example, patent document 1(Japanese Unexamined Patent Application, First Publication No. 10-151450) discloses a method for reducing TOCs by using a lamp which emits wavelength of 185 nm and 254 nm ultraviolet rays within a pure water tank.

In this method, the oxygen molecules in the tank are changed to ozone by radiating ultraviolet rays with a wavelength of 185 nm within the pure water tank. Furthermore, hydroxyl radicals are generated by radiating ultraviolet rays with a wavelength of 254 nm to the ozone. By the ozone and the hydroxyl radicals which are generated, the TOCs are oxidized and decompose to be eliminated.

Moreover, for example, non-patent document 1 ("Water Handbook" Water Handbook Members-of-Editorial-Board Meeting, Maruzen Co., Ltd., March 31, Heisei 15 issue, p. 316-319, p. 345-347) discloses a method of reducing TOCs using a photocatalyst. In this method, a photocatalyst and an ultraviolet-rays light source are disposed in a pure water tank, whereby ultraviolet rays with a wavelength of 380 nm or less are radiated to the photocatalyst so as to generate hydroxyl radicals on the photocatalyst surface, thereby oxidizing and decomposing the TOCs to be eliminated.

However, in the method of using ultraviolet rays with wavelength of 185 nm and 254 nm, the place in the pure water tank where the ozone and the hydroxyl radicals are generated is not specified, and hence there is a possibility that, when ozone and hydroxyl radicals exist near the rubber packing in the tank, the rubber sealing is oxidized and decomposes to generate cracks, thereby causing a leakage of water.

Moreover, in the method of using the photocatalyst, the photocatalyst is a powder which is made of titanium dioxide as the main ingredient, and hence it is used to be carried on the surface of a base material, etc. Since a photocatalyst is a material which is comparatively hard to use as a coat, a binder is mixed when coating. Such a binder is usually an organic material. Therefore, by receiving ultraviolet rays underwater for a long time, hydrolysis may occur, or the binder itself may be oxidized and the binder may be decomposed by the hydroxyl radicals generated on the photocatalyst surface. TOC of the pure water in a pure water tank may increase by decomposition of the binder. Moreover, the binder decomposes to make the base material unable to hold the photocatalyst, such that the photocatalyst diffuses and flows out to the pure water path, thereby weakening the oxidizing effect and decomposing effect of the photocatalyst.

SUMMARY OF THE INVENTION

The present invention was made in view of the above situation. That is, it is an object of the present invention to provide a TOC component removing apparatus and a process for removing TOC components, which are capable of avoiding flowing out of the photocatalyst, and excel in the removal of TOCs, while preventing degradation of sealing etc., by making hydroxyl radicals be generated at a specific place.

In order to attain the above object, the present invention adopts the following constitution.

The first aspect of the present invention is a TOC component removing apparatus including: a treatment tank storing untreated ultrapure water or pure water, a plurality of spherical catalyst particles of which the surfaces are photocatalyst, a tabular translucent support on a surface of which the catalyst particles are distributed and supported, and an ultraviolet-rays light source arranged near the translucent support which radiates ultraviolet rays having a wavelength of 254 nm.

According to the above constitution, ultraviolet rays are radiated to catalyst particles through a translucent support, thereby enabling hydroxyl radicals to be generated only on the surface of the catalyst particles. Although the oxidative effect of hydroxyl radicals is powerful, lifetime thereof is short, and hence hydroxyl radical exists only near the catalyst particle surface, and are not widely spread in the treatment tank, thereby preventing degradation of sealing etc. Moreover, since the catalyst particles are spherical, an area in which hydroxyl radicals generated can be enlarged, and as a result, a high-concentration of hydroxyl radicals can be generated, thereby enabling TOC components to be processed efficiently.

Moreover, since a translucent support is used, there is no possibility that the ultraviolet rays may be interrupted. Thereby, the ultraviolet rays which are not radiated to catalyst particles can be radiated to the entirety of the treatment tank, whereby it becomes possible to sterilize the inside of the treatment tank to suppress generation of TOC components.

Moreover, the TOC component removing apparatus of the present invention may be a TOC component removing apparatus as mentioned previously, in which the catalyst particles are those formed by coating a photocatalyst through a flame spraying method onto the surface of a spherical carrier made of metal or ceramic.

According to the above constitution, since the photocatalyst is coated by a flame spraying method, organic ingredients such as a binder, etc., are not used, thereby preventing increase of the TOC components due to decomposition of the binder.

Moreover, the TOC component removing apparatus of the present invention may be the TOC component removing apparatus mentioned above, in which the treatment tank has an inner surface which is a mirror surface.

According to the above constitution, the radiated ultraviolet rays are reflected by the inner surface of the treatment tank, thereby sterilizing the inside of the treatment tank efficiently.

Moreover, when the ultraviolet rays are radiated to the catalyst particles, portions which become shadowed arise on the catalyst particles, and there is a possibility that photocatalyst action may not develop in the shadows, but the reflected ultraviolet rays can be radiated to the shadows by making the inner wall of the treatment tank into a mirror surface. Thus, according to the above constitution, ultraviolet rays can be radiated all over the surface of the catalyst particles, thereby increasing the removal of the TOC components.

Next, the second aspect of the present invention is a process for removing TOC components from ultrapure water or pure water, including: introducing untreated ultrapure water or pure water into a treatment tank, and disposing a plurality of spherical catalyst particles of which surface are photocatalyst, a tabular translucent support on a surface of which the catalyst particles are distributed and supported, and an ultraviolet-ray light source arranged near the translucent support which radiates ultraviolet rays having a wavelength of 254 nm within the treatment tank, and radiating the ultraviolet rays from the ultraviolet-ray light source to the catalyst particles, and the ultrapure water or the pure water in the treatment tank.

According to the above constitution, ultraviolet rays are radiated to catalyst particles through a translucent support, thereby enabling hydroxyl radicals to be generated only on the surface of the catalyst particles. Although the oxidative effect of hydroxyl radicals is powerful, lifetime thereof is short, and hence hydroxyl radical exists only near the catalyst particle surface, and are not widely spread in the treatment tank, thereby preventing degradation of sealing etc. Moreover, since the catalyst particles are spherical, an area in which hydroxyl radicals are generated can be enlarged, and as a result, a high-concentration of hydroxyl radicals can be generated, thereby enabling TOC components to be processed efficiently.

Moreover, since a translucent support is used, there is no possibility that ultraviolet rays may be interrupted. Thereby, the ultraviolet rays which do not radiated the catalyst particles can be radiated to the entirety of the treatment tank, whereby it becomes possible to sterilize the inside of the treatment tank to suppress generation of the TOC components.

Next, the process for removing TOC components of the present invention is the process for removing TOC components mentioned above, in which the treatment tank has an inner surface which is a mirror surface, thereby reflecting the ultraviolet rays to radiate the reflected ultraviolet rays to the catalytic particles.

According to the above constitution, the radiated ultraviolet rays are reflected by the inner surface of the treatment tank, thereby sterilizing the inside of the treatment tank efficiently.

Moreover, when ultraviolet rays are radiated to the catalyst particles, portions which become shadowed arise on the catalyst particles, and there is a possibility that photocatalyst action may not develop in the shadows, but the reflected ultraviolet rays can be radiated to the shadows by making the inner wall of the treatment tank into a mirror surface. Thus, according to the above constitution, ultraviolet rays can be radiated all over the surface of the catalyst particles, thereby increasing the removal of the TOC components.

DETAILED DESCRIPTION OF THE INVENTION

Figure 1:
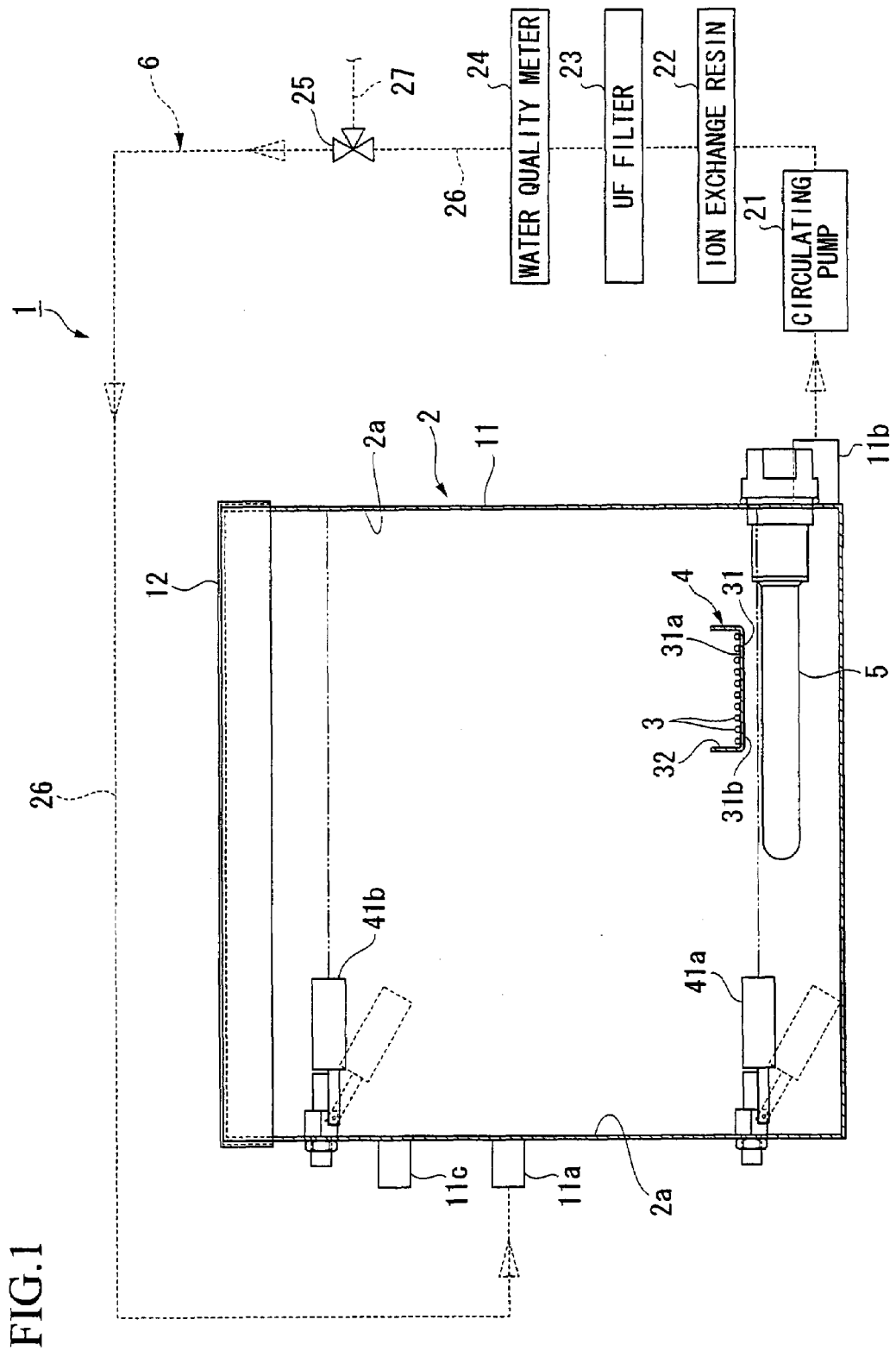
FIG. 1 is a side view of the TOC component removing apparatus of one embodiment of the present invention.

Hereinafter, one preferred embodiment of the present invention will be explained while referring to the drawings. The side view of the TOC component removing apparatus of this embodiment is shown in FIG. 1, and the plan view of the TOC component removing apparatus of this embodiment is shown in FIG. 2.

Figure 2:
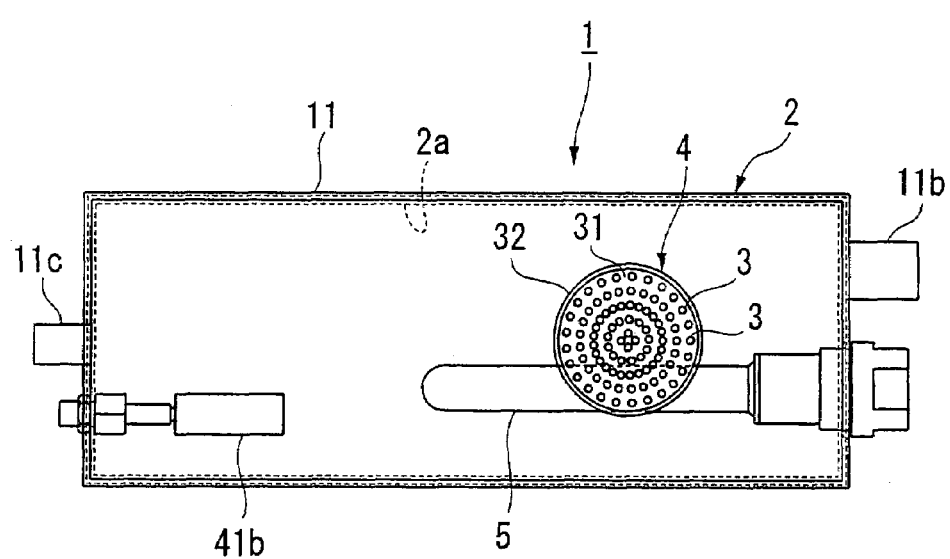
FIG. 2 is a plan view of the TOC component removing apparatus of one embodiment of the present invention.

As shown in FIGS. 1 and 2, the TOC component removing apparatus 1 of this embodiment is mainly constituted from a treatment tank 2 into which untreated ultrapure water or pure water is introduced, and a plurality of spherical catalyst particles 3 having surfaces which are made of a photocatalyst, a tabular translucent support 4 on a surface of which the catalyst particles 3 are distributed and supported, and an ultraviolet-ray light source 5 which is arranged near the translucent support 4 and which radiates ultraviolet rays with a wavelength of 254 nm.

The treatment tank 2 consists of a tank main body 11, and a tank lid 12 which is disposed on the upper part of the tank main body 11. The tank main body 11 and the tank lid 12 are made of stainless steel, etc., for example. Moreover, a circulating water flow inlet 11a, a circulating water flow outlet 11b, and an untreated water feed port 11c are disposed on the tank main body 11. Furthermore, mirror surface processing is performed on the inner wall surface 2a of the treatment tank 2 so as to reflect ultraviolet rays therefrom.

Moreover, a circulating mechanism 6 for the ultrapure water or pure water is connected to the tank main body 11. The circulating mechanism 6 is constituted from a circulating pump 21, an ion-exchange resin 22, an ultra-fine filter 23, a water quality meter 24 for measuring the amount of TOC components, and a three way valve 25 being connected through a circulating path 26. Both ends of the circulating path 26 are connected to the circulating water flow inlet 11a and the circulating water flow outlet 11b of the tank main body 11, respectively. Moreover, a sampling path 27 for sampling the treated water circulating from which the TOC components is removed is connected to the three way valve 25.

Moreover, the introducing path (not shown) for introducing untreated water before removing TOC components into the tank is connected to the untreated water feed port 11c of the tank main body 11.

The catalyst particles 3 are stored inside the treatment tank 2, and coating of the photocatalyst is carried out by a flame spraying method onto the surface of a carrier which consists of a spherical metal or ceramic.

As the carrier, spherical particles made of stainless steel, alumina ceramic, etc., having a diameter of approximately from not less than 3 mm to not more than 6 mm are used. Moreover, as the photocatalyst, those which can generate hydroxyl radicals in response to ultraviolet rays with a wavelength of 254 nm are employable, for example, which consist of $TiO_2$, Ag (silver), etc. Moreover, the photocatalyst is preferably coated on the surface of the carrier at a thickness of approximately from not less than 30 μm to not more than 70 μm. In order to coat the photocatalyst onto the carrier, a flame spraying method, which is a method of fusing a material which constitutes the photocatalyst and then throwing the fused material at the carrier at high speed, is preferably used. It becomes unnecessary to add organic resins, such as a binder, to the photocatalyst when coating through the flame spraying method.

Next, the translucent support 4 is stored inside the treatment tank 2 together with the catalyst particles 3, and consists of a tabular member which transmits ultraviolet rays. The translucent support 4 shown in FIGS. 1 and 2 is mainly constituted from a tabular bottom part 31 and a side wall part 32 disposed upright from the circumference part of the bottom part 31. A plurality of catalyst particles 3 is dispersed over the whole surface 31a of the tabular bottom part 31. As for the catalyst particles 3, it is preferred that the catalyst particles 3 be disposed leaving a spaces therebetween, such that they may not contact each other. Moreover, the material of the translucent support 4 may be one which can transmit ultraviolet-rays, and for example, silica glass, soft glass, ultraviolet-ray penetrative acrylics, etc., cay be employed.

Next, the ultraviolet-ray light source 5 which radiates ultraviolet rays with a wavelength of 254 nm, is disposed onto another surface 31b of the bottom part 31 of the translucent support 4. The ultraviolet rays emitted from the ultraviolet-ray light source 5 are radiated to the circulating water and the catalyst particles 3 in the treatment tank 2.

Moreover, in the treatment tank 2, two float switches 41 for detecting the water level in the treatment tank 2 are disposed. The float switch 41a at the bottom of the treatment tank 2 is for detecting drying up of the water, whereas the float switch 41b at the upper part of the treatment tank 2 is for detecting a high water level.

Next, the process for treating the TOC components in the ultrapure water using the above TOC component removing apparatus 1 will be explained.

First, the untreated water which has been passed through a reverse osmosis membrane and an ion-exchange resin is introduced into the treatment tank 2 from the untreated water feed port 11a. The untreated water is a water from which cations and anions dissolved therein have been removed by the ion-exchange resin, while minute suspended substances have been removed by the reverse osmosis membrane. However, TOC components have not been removed.

Next, after the treatment tank is filled with untreated water, supplying of untreated water is stopped, and the circulating pump 21 is operated to circulate the untreated water between the treatment tank 2 and the circulating mechanism 6. At this time, the three way valve 25 is in the "closed" state with respect to the sampling path 27.

Next, ultraviolet rays with a wavelength of 254 nm are generated from the ultraviolet-ray light source 5. Some of the generated ultraviolet rays permeate the translucent support 4 to be radiated to the catalyst particles 3. The photocatalyst is coated onto the surface of the catalyst particles 3, and hydroxyl radicals are generated when ultraviolet rays are radiated to this photocatalyst. By the generated hydroxyl radicals, the untreated underwater TOC components in the untreated water are oxidized and decomposed.

Moreover, the remaining ultraviolet rays generated from the ultraviolet-ray light source 5 are directly radiated to the untreated water in the treatment tank 2. Thereby, the untreated water is sterilized and increase of the TOC components due to the increase of bacteria can be prevented beforehand. Moreover, since the translucent support 4 shows permeability to ultraviolet rays, ultraviolet rays are not interrupted by the translucent support 4, and as a result, ultraviolet rays can be radiated to the whole inside of the treatment tank 2.

Furthermore, since the ultraviolet rays directly radiated to the untreated water in the treatment tank 2 are reflected by the mirror inside the treatment tank 2, the sterilizing effect on the untreated water can be increased further.

Moreover, on the catalyst particles 3, portions which act as shadows by which ultraviolet rays are not radiated directly onto from the ultraviolet-ray light source 5 may be formed depending on the spatial relationship between the catalyst particles 3 and the ultraviolet-ray light source 5. Specifically, in FIG. 1, the upper sides of the catalyst particles 3 become shadows against the ultraviolet-ray light source 5. There is a possibility that the photocatalyst at this portion of the shadows may not be used effectively. However, in the TOC component removing apparatus 1 of this embodiment, since the inner wall surface of the treatment tank 2 is made to be a mirror surface, such that the ultraviolet rays directly radiated to the untreated water are reflected therefrom, some of these ultraviolet rays are reflected by the mirror surface and are radiated to the portions of the photocatalyst which becomes shadowed. Thereby, also at the portions which becomes shadowed against the ultraviolet-ray light source 5, hydroxyl radicals can be generated, and as a result, the concentration of hydroxyl radicals can be increased, thereby removing TOC components efficiently.

As mentioned above, the TOC components in the untreated water decrease gradually due to performance of ultraviolet-ray irradiation continuously, while continuing circulation of the untreated water. When the concentration of the TOC components is less than a predetermined value, the three way valve 25 is operated to make the sample path "open", and the treated ultrapure water or pure water is sampled. If the amount of circulating water in the treatment tank 2 and the circulating mechanism 6 decreases, untreated water is supplied again from the untreated water feed port 11a.

As explained above, according to the TOC component removing apparatus and the process for removing the TOC components of this embodiment, hydroxyl radicals can be generated only on the surface of the catalyst particles 3, and the TOC components can be decomposed and removed.

Although the oxidative effect of hydroxyl radicals is powerful, lifetime thereof is short, and hence hydroxyl radicals exist only near the catalyst particles 3 surface, and are not widely spread in the treatment tank 2, thereby preventing degradation of sealing etc. Moreover, since the catalyst particles 3 are spherical, an area in which hydroxyl radicals are generated can be enlarged, and as a result, a high-concentration of hydroxyl radicals can be generated, thereby enabling the TOC components to be processed efficiently.

Moreover, since a translucent support 4 is used, there is no possibility that the ultraviolet rays may be interrupted. Thereby, the ultraviolet rays which do not radiated to the catalyst particles 3 can be radiated to the entirety of the treatment tank 2, whereby it becomes possible to sterilize the inside of the treatment tank 2 to suppress generation of the TOC components.

Moreover, according to the above constitution, since the photocatalyst is coated by a flame spraying method, organic ingredients such as a binder, etc., are not used, thereby preventing increase of the TOC components due to decomposition of the binder.

In addition, the radiated ultraviolet rays are reflected by the inner surface of the treatment tank 2, thereby sterilizing the inside of the treatment tank efficiently.

Moreover, when ultraviolet rays are radiated to the catalyst particles 3, portions which become shadowed arise on the catalyst particles, and there is a possibility that photocatalyst action may not develop in the shadows, but the reflected ultraviolet rays can be radiated to the shadows by making the inner wall surface of the treatment tank 2 into a mirror surface. By this, ultraviolet rays can be radiated all over the surface of the catalyst particles 3, thereby increasing the removal of the TOC components.

It should be noted that the present invention is not limited to the above embodiment, and may various changes may be made. For example, it is possible to arrange the position of the ultraviolet-ray light source not only at the lower part of the translucent support but also at the upper part of the translucent support, i.e., above the catalyst particles. Moreover, it is possible to arrange the ultraviolet-ray light source and the translucent support equipped with catalyst particles not only in one treatment tank but in a plurality of places.

As explained above, according to the TOC removing apparatus and the process for removing TOC components of the present invention, degradation of sealing, etc., can be prevented by generating hydroxyl radicals at a specific place, flowing out of the photocatalyst can be prevented, and the removal of TOCs can be improved further.

The present invention relates to the technology of removing TOC components contained in liquids, such as ultrapure water used in a production process for semiconductors, liquid crystal, or medical supplies.

What is claimed is:

1. A process for removing TOC components from ultrapure water or pure water, comprising:

introducing untreated ultrapure water or pure water into a treatment tank having an inner surface which is a mirror surface, and disposing a plurality of spherical catalyst particles of which surfaces are photocatalyst prepared by a flame-spraying method, a tabular translucent support on a surface of which the catalyst particles are distributed and supported, and an ultraviolet-ray light source arranged near the translucent support which radiates ultraviolet rays having a wavelength of 254 nm within the treatment tank, and radiating ultraviolet rays from the ultraviolet-ray light source to the catalyst particles, and the ultrapure water or the pure water in the treatment tank.

\* \* \* \* \*